(12) United States Patent
Heilper et al.

(10) Patent No.: US 11,079,825 B2
(45) Date of Patent: Aug. 3, 2021

(54) COMPILER GUIDED POWER ALLOCATION IN COMPUTING DEVICES

(71) Applicant: Intel Corporation, Santa Clara, CA (US)

(72) Inventors: Anat Heilper, Haifa (IL); Eran Dagan, Tel Aviv (IL); Amit Bleiweiss, Yad Binyamin (IL); Amit Gur, Haifa (IL)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 16/539,138

(22) Filed: Aug. 13, 2019

(65) Prior Publication Data
US 2019/0369696 A1    Dec. 5, 2019

(51) Int. Cl.
*G06F 1/3206* (2019.01)
*G06N 3/06* (2006.01)
*G06F 1/3234* (2019.01)
*G06F 1/3296* (2019.01)

(52) U.S. Cl.
CPC .......... *G06F 1/3206* (2013.01); *G06F 1/3243* (2013.01); *G06F 1/3296* (2013.01); *G06N 3/06* (2013.01)

(58) Field of Classification Search
CPC .................................................. G06F 1/3206
USPC ........................................................ 713/340
See application file for complete search history.

(56) References Cited

U.S. PATENT DOCUMENTS

| | | | | |
|---|---|---|---|---|
| 2007/0300214 A1* | 12/2007 | Chang | ................... | G06F 8/4432 717/153 |
| 2009/0271167 A1* | 10/2009 | Zhu | ........................ | G06F 30/331 703/14 |
| 2012/0254643 A1* | 10/2012 | Fetzer | ...................... | G06F 1/324 713/320 |
| 2013/0167252 A1* | 6/2013 | Major | ................... | G06F 1/3287 726/29 |
| 2014/0136858 A1* | 5/2014 | Jacobson | .................. | G06F 9/46 713/300 |
| 2015/0058653 A1* | 2/2015 | Blayvas | ................ | G06F 1/3206 713/340 |
| 2020/0310515 A1* | 10/2020 | Jana | ....................... | G06F 1/3206 |

OTHER PUBLICATIONS

Yung-Cheng Ma, Compiler-Directed Parallelis Scaling Framework for Performance Constrained Energy Optimization, 2019, IEEE, pp. 22 (Year: 2019).*

(Continued)

*Primary Examiner* — Suresh Suryawanshi
(74) *Attorney, Agent, or Firm* — Hanley, Flight & Zimmerman, LLC

(57) ABSTRACT

Apparatus, devices, systems, methods, and articles of manufacture are disclosed to allocate power in a computing device. An example system includes a compiler to: analyze power consumption behavior of power consumption units of the computing device; build a power profile; and generate source code with hints of the power profile. The example system includes a power control circuit to: develop a power policy using the hints of the power profile and requests for power licenses from the power consumption units of the computing device; and allocate power to the power consumption units based on the power profile.

18 Claims, 4 Drawing Sheets

(56) References Cited

OTHER PUBLICATIONS

Haj-Yihia et al, Fine-Grain Power Breakdown of Modern Out-of-Order Cores and Its implications on Skylake-Based Systems, 2016, ACM Transactions on Architecture and Code Optimization, vol. 13, No. 4, Article 56, pp. 25 (Year: 2016).*
Ortiz et al, High-Level Optimization for Low Power Consumption on Microprocessor-Based Systems, 2007, IEEE, pp. 4 (Year: 2007).*

* cited by examiner

COMPILER GUIDED POWER ALLOCATION IN COMPUTING DEVICES

FIELD OF THE DISCLOSURE

This disclosure relates generally to power allocation in computing devices, and, more particularly, to compiler guided power allocation in computing devices.

BACKGROUND

In some computing devices, a power management unit allocates power to different components of the computing device. Power allocation can change based on changing power needs of the components.

BRIEF DESCRIPTION OF THE DRAWINGS

In general, the same reference numbers will be used throughout the drawing(s) and accompanying written description to refer to the same or like parts.

DETAILED DESCRIPTION

Figure 1:
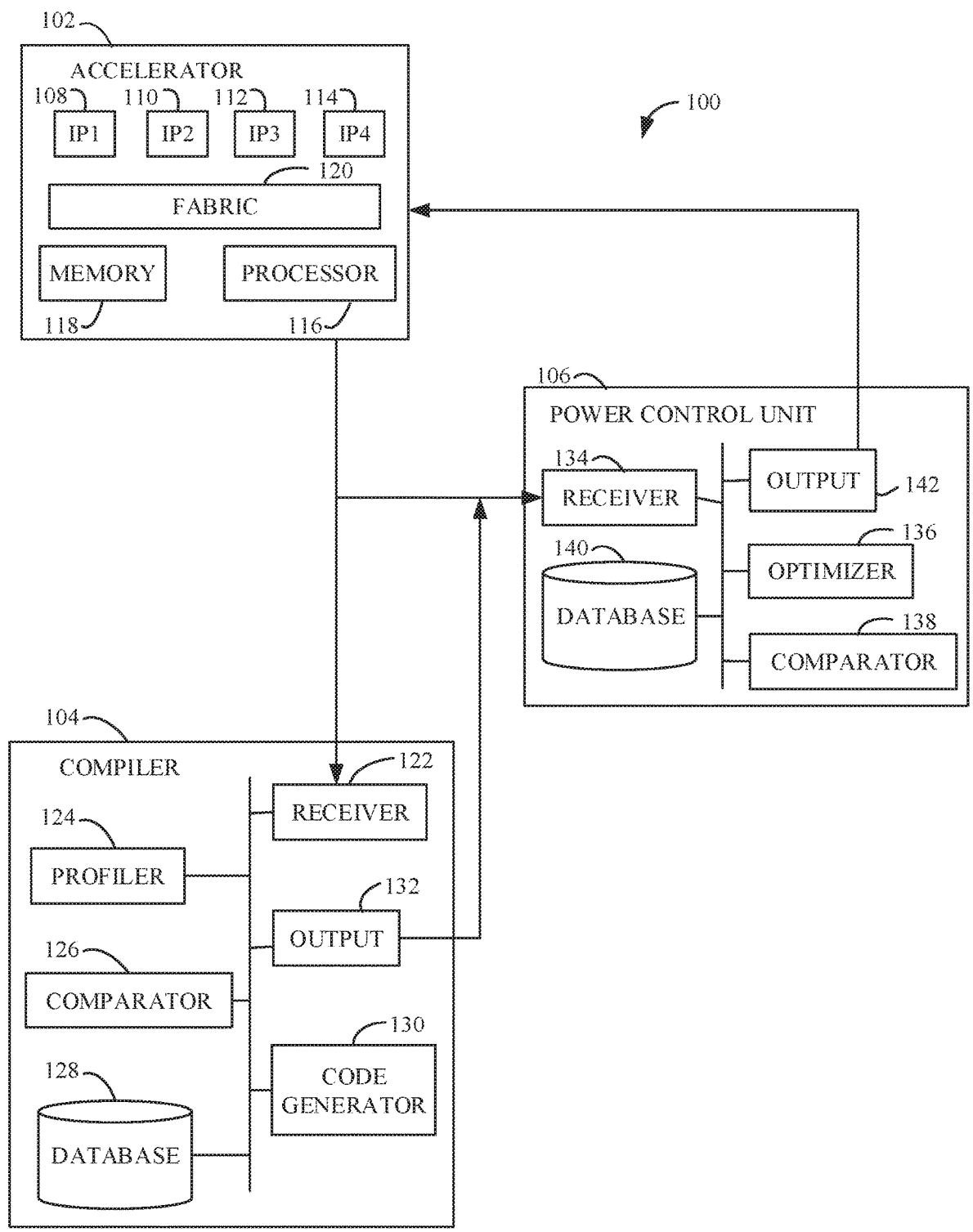
FIG. 1 is a block diagram of an example system of compiler guided power allocation in accordance with the teachings of this disclosure.

There has been and continues to be transformational development of artificial intelligence (AI) across many industries and facets of modern life including, for example, security, entertainment, Internet of Things (IoT) devices, autonomous driving, etc. These developments of AI include rapid algorithmic evolvement to support different AI topologies, a variety of numerical precision representations, different types and sizes of data, and advanced latency and power requirements. The workloads, topologies, and algorithms related to AI technologies change over time, sometimes rapidly. In addition, some AI workload characteristics include inner layer-to-layer variation with respect to compute and bandwidth needs of computing devices.

Disclosed herein are advancements to fine tuning of different power requirements of components of a computing device during the execution of a workload such as, for example, an AI workload. Traditional power optimization methods do not account for differences in AI workloads behavior. In addition, in some examples, AI workloads feature domain specific optimization opportunities because such AI workloads may have more regular (e.g., predefined, expected, etc.) behavior than usual client applications. In some examples disclosed herein, prior or advanced knowledge can provide power optimization hints and/or directions that can be better utilized in hardware assisted power management circuits.

The examples disclosed herein include a hardware/software co-design that enables an AI workload to be compiled ahead of time. A compiler shares workload knowledge with a power control unit including, for example, power management hardware, software, and/or firmware. Components of the computing device including, for example, functional blocks of an AI accelerator and/or other power consumption units negotiate with the power control unit for power and performance optimization. The knowledge of workload performance that is analyzed, processed, and shared by the compiler includes, in some examples, data related to the operation of the power consumption units in the form of a configurable table or graph of power levels tuned according to different workload scenarios of the power consumption units. The power control unit consolidates all requests for power from the power consumption units and decides on a power policy using the knowledge shared by the compiler. The power policy indicates the level of power to be provided to the power consumption units for an amount of time.

The examples disclosed herein provide a unique and flexible method of power and performance optimization for AI training and inference workloads that enables optimization of power allocation on-the-fly or dynamically in a fast and efficient manner. Utilizing the advanced knowledge analyzed and developed by the compiler is unique for AI workloads and graphs. Furthermore, the compiler activity can occur offline rather than during a runtime or execution phase of the computing device. In addition, power aware compilation or compiler guided power allocation utilizes the advanced knowledge or data in the compilation process and enables the power management hardware such as, for example, the power control unit to make the accurate power considerations, dynamically fine grain control the power policy, reduce the need for power guard bands, and provide better quality of services to the different modules or power consumption units running in the computing device, each of which has its own power usage characteristics.

FIG. 1 is a block diagram of an example system 100 of compiler guided power allocation in accordance with the teachings of this disclosure. The system 100 of FIG. 1 includes an example accelerator 102. The example system 100 also includes an example compiler 104 and an example power control unit 106.

The accelerator 102 is, in some examples, a hardware device, firmware, a software program, and/or a combination thereof that enhances performance of a computing device. In some examples, the accelerator 102 represents the computing device. Also, in some examples, the accelerator 102 represents an AI module or component. The accelerator 102 includes a first example power consumption unit (IP1) 108, a second example power consumption unit (IP2) 110, a third example power consumption unit (IP3) 112, a fourth example power consumption unit (IP4) 114, an example processor 116, an example memory 118, and an example fabric 120.

The power consumption units 108, 110, 112, 114 include, in some examples, intellectual property (IP) cores or compute engines. In some examples, the IP cores or compute engines include static random-access memory (SRAM) such as DeepSRAM, ternary neural networks (TNN), artificial neural networks (ANN), an integrated development environment (IDS) such as for example Delphi, a digital signal processor (DSP), and/or other power consumption units. Additionally or alternatively, in some examples, the power consumption units 108, 110, 112, 114 include one or more analog components or devices. Though four power consumption units are shown in FIG. 1, the accelerator 102 may include any number of power consumption units such as, for example, one, two, three, five, six, or more.

The accelerator 102 also includes the processor 116 that operates the accelerator 102 and the power consumption units 108, 110, 112, 114. The memory 118 may be, for example, a main memory (MM), a direct access memory (DMA) and/or other suitable types of memory. The memory 118 may store data related to the operation of the accelerator 102 including, for example, power consumption activity of the power consumption units 108, 110, 112, 114. The power consumption activity may include requests for power licenses, history of power level consumption, history of time durations of power consumption, memory usage, and other data related to the operation and workload activity of the power consumption units 108, 110, 112, 114.

The compiler 104 includes an example receiver 122, an example profiler 124, an example comparator 126, an example database 128, an example code generator 130, and an example output 132. The receiver 122 of the compiler 104 receives and/or retrieves data from the accelerator 102. In some examples, the data includes data related to the operation and workload activity of the power consumption units 108, 110, 112, 114.

The profiler 124 analyzes the workload activity data. In some examples, the profiler 124 analyzes the workload activity data offline and before the power control unit 106 operates to allocate power to the power consumption units 108, 110, 112, 114. In some examples, the profiler 124 analyzes basic workload primitives when performing a power profile. Also, in some examples, the profiler 124 profiles power in two phases. In the first phase, the profiler 124 analyzes hardware behavior of the power consumption units 108, 110, 112, 114 at different workloads, with different parameters to different layers of the workloads. The profiler 124 categorizes the behavior using, for example, a table of the most common behaviors. An example compiler power level profiling table is shown in Table 1.

TABLE 1

| AI Operation | Memory Usage | Cdyn |
| --- | --- | --- |
| Idle | Idle | 0.1 pF |
| Convolution - high utilization | High | 2.7 pf |
| Long short-term memory (LSTM) | Low | 1.9 pF |
| Softmax | High | 1.1 pF |
| Fully connected - low utilization | Low | 0.3 pF |
| Pooling - high utilization | High | 2.1 pF |
| Pooling - low utilization | Low | 0.8 pF |

Cdyn represents dynamic capacitance, which is a value of capacitance of different elements of the accelerator 102. The capacitance is measured in picofarads (pF). Power consumption of a power consumption unit is determined based on the capacitance, voltage, and the frequency of the power consumption unit as shown, for example in Equation 1.

$$P = CV^2 f \qquad \text{Eqn. (1)}$$

The term maximum dynamic capacitance (Cdyn_max) generally refers to the maximum amount of dynamic capacitance for an integrated circuit component or other power consumption unit. In some examples, such as, for example, with central processing units (CPUs), Cdyn_max indicates a capability of sustaining the Cdyn_max over a relatively long period of time. The maximum sustainable Cdyn may be different values for different operating durations of different power consumption units 108, 110, 112, 114 based on the complexity of the different power consumption units 108, 110, 112, 114, latencies, and interactions between the power consumption units 108, 110, 112, 114. Accordingly, controlling the value of Cdyn_max may have a direct effect on power-efficiency and/or speed of the power consumption units 108, 110, 112, 114.

Table 1 also includes several example AI operations. Convolution is a mathematical operation that determines the integral of the product of two functions or signals, which one of the functions or signals inverted. Convolution operations are useful in determining patterns in signals, comparing a correlation between two signals, filtering signals for audio processing, image processing, etc. Convolutional neural networks are networks that use the convolution operation in place of a general matrix multiplication in at least one of the layers.

Softmax is a mathematical operation that takes as input a vector of K real numbers, and normalizes the input into a probability distribution that includes K probabilities. Softmax has application in neural networks including, for example, as the final layer of a neural network-based classifier. Softmax also has application in reinforcement learning to, for example, convert values into action probabilities.

Fully connected neural networks are networks with layers in which each output is depends on each input. Pooling layers reduce data dimensions by combining neuron clusters at one layer into a single neuron in the next layer. Other functions, layers, and/or operations of AI and/or general operation of the computing device other than those shown in Table 1 may be analyzed for power allocation.

The second phase of profiling power behavior includes the profiler 124 translating different operating states of the different power consumption units 108, 110, 112, 114 for the power control unit 106. In particular, the profiler 124 tests different scenarios of different operating states (e.g., high, low, idle) for the power consumption units 108, 110, 112, 114. Power is allocated based on the needs of the power consumption units 108, 110, 112, 114. An example of compiler allocated power distribution for different scenarios is shown in Table 2, indexed by Cdyn values per scenario.

TABLE 2

| Scenario | IP1 State | IP2 State | IP3 State | IP1 Cdyn | IP2 Cdyn | IP3 Cdyn | Cdyn Sum |
| --- | --- | --- | --- | --- | --- | --- | --- |
| 1 | Idle | Low | Idle | 400 | 480 | 20 | 900 |
| 2 | Low | Idle | Idle | 800 | 200 | 20 | 1020 |
| 3 | Idle | Low | Low | 400 | 480 | 350 | 1230 |
| 4 | Low | Low | Idle | 800 | 480 | 20 | 1300 |
| 5 | Low | Idle | Low | 800 | 200 | 350 | 1350 |
| 6 | Idle | Low | High | 400 | 480 | 700 | 1580 |
| 7 | Low | Low | Low | 800 | 480 | 350 | 1630 |
| 8 | Low | Idle | High | 800 | 200 | 700 | 1700 |
| 9 | Idle | High | Idle | 400 | 1320 | 20 | 1740 |
| 10 | Low | Low | High | 800 | 480 | 700 | 1980 |
| 11 | Idle | High | Low | 400 | 1320 | 350 | 2070 |
| 12 | Low | High | Idle | 800 | 1320 | 20 | 2140 |
| 13 | High | Idle | Idle | 2200 | 200 | 20 | 2420 |
| 14 | Idle | High | High | 400 | 1320 | 700 | 2420 |
| 15 | Low | High | Low | 800 | 1320 | 350 | 2470 |
| 16 | High | Low | Idle | 2200 | 480 | 20 | 2700 |
| 17 | High | Idle | Low | 2200 | 200 | 350 | 2750 |
| 18 | Low | High | High | 800 | 1320 | 700 | 2820 |
| 19 | High | Low | Low | 2200 | 480 | 350 | 3030 |
| 20 | High | Idle | High | 2200 | 200 | 700 | 3100 |
| 21 | High | Low | High | 2200 | 480 | 700 | 3380 |
| 22 | High | High | Idle | 2200 | 1320 | 20 | 3540 |
| 23 | High | High | Low | 2200 | 1320 | 350 | 3870 |
| 24 | High | High | High | 2200 | 1320 | 700 | 4220 |

Table 2 logs the results of different operating scenarios of three power consumption units 108, 110, 112. For example, in the first scenario, the first power consumption unit 108 idle, the second power consumption unit 110 is operating in a low state, and the third power consumption unit 112 is idle. In this example, the first power consumption unit 108 has a Cdyn value of 400, the second power consumption unit 110 has a Cdyn value of 480, and the third power consumption unit 112 has a Cdyn value of 20. The total Cdyn value in this scenario is 900. The profiler 124 maps out different combinations of operating states across many scenarios to map maximum dynamic capacitance expected during the different combinations of operating states of the power consumption units 108, 110, 112. Though three of the power consumption units were tested in the example of Table 2, in other examples, the profiler 124 can test all power consumption units of a computing device or different combinations of power consumption units less than all of the power consumption units.

The profiler 124 uses the data from Table 2 for power optimization. The profiler 124 determines the power requirements at any time during execution of the workloads. The profiler 124 selects parameters of the workloads of the power consumption units 108, 110, 112, 114 and analyzes the behavior of the power consumption units 108, 110, 112, 114 to build the power profile such as, for example, the profiles shown in the power level data of Table 2. The profiler 124 builds intervals of power requests. As the computing device operates, different ones of the power consumption units 108, 110, 112, 114 have different power needs over time. The profiler 124 builds the intervals in, for example, 500 microsecond increments. Other durations may be used in other examples. The operating state of individual ones of the power consumption units 108, 110, 112, 114 may or may not change from one interval to the next subsequent interval. Nonetheless, over time, i.e., over multiple intervals, there are changes in the power needs of the power consumption units 108, 110, 112, 114. Requests for power by the power consumption units 108, 110, 112, 114 can change over time to reflect the changing power needs.

The comparator 126 of the compiler 104 compares the Cdyn sum for an interval against the maximum, Cdyn_max. The comparator 126 of the compiler 104 safeguards against exceeding a maximum potential power. If a threshold level of dynamic capacitance and, therefore, power is exceeded in a specific operating state scenario, the profiler 124 can reallocate power and/or otherwise change an operation state of one or more of the power consumption units 108, 110, 112, 114.

Example code that includes compiler power aware directions for verifying that maximum potential power is not exceeded can include:

```
Iccp_time_window current, next;
//find minimal ICCP window within layer boundaries
Find_minimal_iccp_window(start_time, &current); find initial
window ~ 500 usec
Find_minimal_iccp_window(current.stop, &next0; find initial
window ~ 500 usec
For(t = start_time, t < end of execution time){
    // for each layer within that time interval, get ICCP level
from ice_estimator, set max for that time interval
        calc_max_iccp_level ( current );
        calc_max_iccp_level (next );
        // try to keep ICCP level low as long as possible
        If(current_level == next_level)
            merge_windows(current, next)
        If (current.level < next.level)
            Extend_current_iccp_window(current, next): // check if
beginning of next window can be merged to current
        Else
            extend_next_iccp_window(current, next); // extend next
only if current does not decrease below 450 usec
        // prepare to next iteration
        current = next
        Find_minimal_iccp_window(next)
```

-continued

ICCP represents inter-control center communications protocol. In other examples, other protocols are applicable. In addition, intervals or windows of 500 microseconds are used in this example. In other examples, windows of other durations may be used. The value of the time interval is configurable and can be defined as a minimal response time including, in some examples, a minimal pCode response time. In some examples, this number is platform specific. In other examples, other code may be used to accomplish the aforementioned tasks. With these examples, the compiler 104 guarantees that a specific interval of workload operation will not exceed the Cdyn amount. This enables the power control until 106 to avoid taking into account unnecessary guard bands for the specific workload at the specific layer (with the specific parameters). In traditional power allocation schemes, this information is not available, and the power managers need to assume worst case scenario and take into consideration the highest potential power consumption of each power consumption unit.

In some examples, the profiler 124 analyzes or otherwise considers different constraints when defining or building the intervals. For example, in some environments or operating scenarios, having an interval that is too short can cause a lot of noise to the power control unit 106 as the power requests from the power consumption units 108, 110, 112, 114 would be too frequent. On the other hand, having an interval that is too long would miss out of more finely tuned power requests that would lead to better or improved performance of the accelerator 102.

The database 128 can store data related to the workloads, the power consumption units 108, 110, 112, 114, the accelerator 102 in general, the optimized power intervals, the data of Tables 1 and 2, etc. for reference and future use. In addition, the data stored in the database 128 is used to build hints that are used by the compiler 104 to send workload knowledge to the power control unit 106.

The source code generator 130 develops source code with knowledge, information, or hints of the workload operations and power behavior of the power consumption units 108, 110, 112, 114 included therein. The hints included in the source code inform the power control unit 106 as to the power consumption levels and durations for the power consumption units 108, 110, 112, 114 in different states of operation. An example source code with example power behavior hints may include:

```
Iccp_time_window current, next;
//find minimal ICCP window within layer boundaries
Find_minimal_iccp_window(start_time, &current); find initial
window ~ 500 usec
Find_minimal_iccp_window(current.stop, &next); find initial
window ~ 500 usec
For(t = start)time, t < end of execution time){
    // for each layer within that time interval, get ICCP level
from ice_estimator, set max for that time interval
        calc_max_iccp_level ( current );
        calc_max_iccp_level (next );
        // try to keep ICCP level low as long as possible
        If(current_level == next_level)
            merge_windows(current, next)
        If (current.level < next.level)
            Extend_current_iccp_window(current, next): // check if
beginning of next window can be merged to current
        Else
            Extend_next_iccp_window(current, next); // extend next
```

-continued

```
only if current does not decrease below 450 usec
  // prepare to next iteration
  current = next
    Find_minimal_iccp_window(next)
```

In addition, intervals or windows of 500 microseconds are used in this example. In other examples, windows of other durations may be used. As indicated above, in some examples, the value of the time interval is configurable, may be defined as a minimal response time (e.g., a minimal pCode response time), and may be platform specific. Also, in other examples, other code may be used to accomplish the aforementioned tasks. The output 132 transmits the source code with the hints to the power control unit 106.

The example power control unit 106 includes an example receiver 134, an example optimizer 136, an example comparator 138, an example database 140, and an example output 142. The receiver 134 of the power control unit 106 receives requests for power from the accelerator 102. The power requests may be referred to as power licensing. In some examples, the receiver 134 of the power control unit 106 receives requests for power licenses directly from the power consumption units 108, 110, 112, 114 individually and/or independently. The power consumption units 108, 110, 112, 114 independently execute their own recipe or instructions for neural network operations or other functionality, which have different power requirements. The power requirements also change over time. Thus, the power consumption units 108, 110, 112, 114 and/or the accelerator 102 in general sends power license requests to the power control unit 102 that change over time. The receiver 134 of the power control unit 106 also receives the source code with the power behavior and requirement hints from the compiler 104.

Rather than employ heuristic techniques during a runtime or execution phase of the power consumption units 108, 110, 112, 114, the optimizer 136 analyzes the hints in the source code compiled by the compiler 104 related to the power behavior of the power consumption units 108, 110, 112, 114 across different scenarios of operating states. The optimizer 136 also analyzes the requests for power licenses from the power consumption units 108, 110, 112, 114. The power consumption units 108, 110, 112, 114 negotiate or bid with the power control unit 104 for requested power levels. The optimizer 136 develops a power policy based on the requests from the power consumption units 108, 110, 112, 114 and the hints in the source code from the compiler 104 to allocate different power levels to the power consumption units 108, 110, 112, 114 for different intervals or durations of time. The power policy can also account of changes in power requests over time.

The comparator 138 of the power control unit 106 compares the total Cdyn value for the power consumption units 108, 110, 112, 114 in a time interval to a maximum value, Cdyn_max, to ensure that the power allocated in the time interval does not exceed a maximum power. In some examples, the comparator 138 of the power control unit 106 and/or optimizer maintain a guard band of power. In the examples disclosed herein, the guard band may be minimized compared to traditional power allocation schemes.

If the total Cdyn for the power consumption units 108, 110, 112, 114 in a time interval causes or would cause an excessive allocation of power, the optimizer 136 reallocates power or changes one or more operating characteristics of one or more of the power consumption units 108, 110, 112, 114. The reallocation or change in operating characteristics is to maintain acceptable power levels. An example change in operating characteristics is a change in frequency of one or more of the power consumption units 108, 110, 112, 114. The frequency change to, for example, a lower frequency would lower the power level in accordance with Equation 1. The optimizer 136 can dynamically change one or more operating characteristics of one or more of the power consumption units 108, 110, 112, 114 during operation of the computing device. In this example, on-the-fly power allocation can be achieved based on the hints developed by the compiler 104 and integrated into the source code offline or otherwise before the power consumption units 108, 110, 112, 114 are in operating or power consuming states.

Power policies that maintain acceptable levels of power distribution may be recorded in the database 140 of the power control unit 106. The database 140 of the power control unit 106 can also store the source code and power behavior hints from the code generator 130, the tables detailed here, and/or other data related to the functionality of the components of the system 100.

The output 142 of the power control unit 106 implements the power policy by sending the power allocations to the accelerator 102 and the power consumption units 108, 110, 112, 114.

In some examples, the output 132 of the compiler 104 and/or the output 142 of the power control unit 106 presents the power hints to a user of the computing device. The user could make additional or alternative adjustments to the power policy using, for example, optimization knobs and/or other input mechanisms that may be used to adjust operating parameters of any of the components of the system 100.

In some examples, the profiler implements analyzing means. The analyzing means may be implemented by a processor such as the processor of FIG. 4 executing instructions such as the instructions of FIG. 2. In some examples, the code generator 130 implements means for generating source code. The means for generating source code may be implements by a processor such as the processor of FIG. 4 executing instructions such as the instructions of FIG. 2. In some examples, the comparator 126 of the compiler 104 implements means for verifying a maximum power in respective intervals maintains capacitance less than a maximum Cdyn. The verifying means may be implemented by a processor such as the processor of FIG. 4 executing the instructions of FIG. 2.

In some examples, the optimizer implements means for developing a power policy. The developing means may be implemented by a processor such as the processor of FIG. 5 executing instructions such as the instructions of FIG. 3. In some examples, the comparator 138 of the power control unit 106 implements means for verifying a maximum power in a power policy maintains capacitance less than a maximum Cdyn. The verifying means may be implemented by a processor such as the processor of FIG. 5 executing the instructions of FIG. 3.

While an example manner of implementing the example accelerator 102, the example compiler 104, and the example power control unit 106 is illustrated in FIG. 1, one or more of the elements, processes, and/or devices illustrated in FIG. 1 may be combined, divided, re-arranged, omitted, eliminated, and/or implemented in any other way. Further, the example power consumption unit 108, the example power consumption unit 110, the example power consumption unit 112, the example power consumption unit 114, the example processor 116, the example memory 118, the example fabric 120, the example receiver 122, the example profiler 124, the example comparator 126, the example database 128, the example code generator 130, the example output 132, the example receiver 134, the example optimizer 136, the example comparator 138, the example database 140, the example output 142, and/or, more generally, the example accelerator 102, the example compiler 104 and/or the example power control unit 106 of FIG. 1 may be implemented by hardware, software, firmware, and/or any combination of hardware, software, and/or firmware. Thus, for example, any of the example power consumption unit 108, the example power consumption unit 110, the example power consumption unit 112, the example power consumption unit 114, the example processor 116, the example memory 118, the example fabric 120, the example receiver 122, the example profiler 124, the example comparator 126, the example database 128, the example code generator 130, the example output 132, the example receiver 134, the example optimizer 136, the example comparator 138, the example database 140, the example output 142, and/or, more generally, the example accelerator 102, the example compiler 104 and/or the example power control unit 106 of FIG. 1 could be implemented by one or more analog or digital circuit(s), logic circuits, programmable processor(s), programmable controller(s), graphics processing unit(s) (GPU(s)), digital signal processor(s) (DSP(s)), application-specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example, power consumption unit 108, the example power consumption unit 110, the example power consumption unit 112, the example power consumption unit 114, the example processor 116, the example memory 118, the example fabric 120, the example receiver 122, the example profiler 124, the example comparator 126, the example database 128, the example code generator 130, the example output 132, the example receiver 134, the example optimizer 136, the example comparator 138, the example database 140, the example output 142, the example accelerator 102, the example compiler 104 and/or the example power control unit 106 is/are hereby expressly defined to include a non-transitory computer readable storage device or storage disk such as a memory, a digital versatile disk (DVD), a compact disk (CD), a Blu-ray disk, etc. including the software and/or firmware. Further still, the example the example accelerator 102, the example compiler 104 and/or the example power control unit 106 of FIG. 1 may include one or more elements, processes, and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
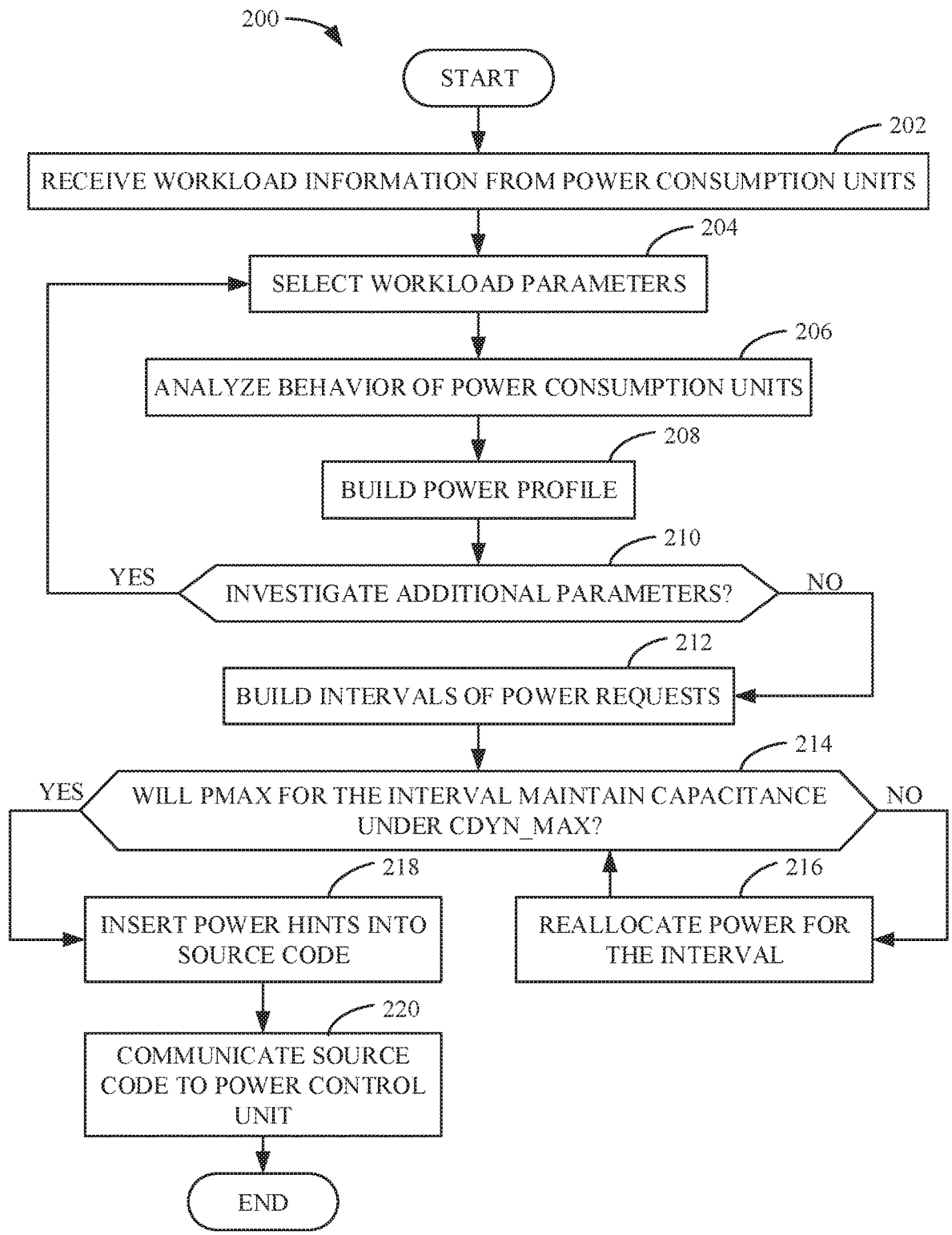
FIG. 2 is a flowchart representative of machine readable instructions that may be executed to implement the example compiler of FIG. 1.

A flowchart representative of example hardware logic, machine readable instructions, hardware implemented state machines, and/or any combination thereof for implementing the compiler 104 of FIG. 1 is shown in FIG. 2. The machine readable instructions may be one or more executable programs or portion(s) of an executable program for execution by a computer processor such as the processor 412 shown in the example processor platform 400 discussed below in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 2, many other methods of implementing the example compiler 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 3:
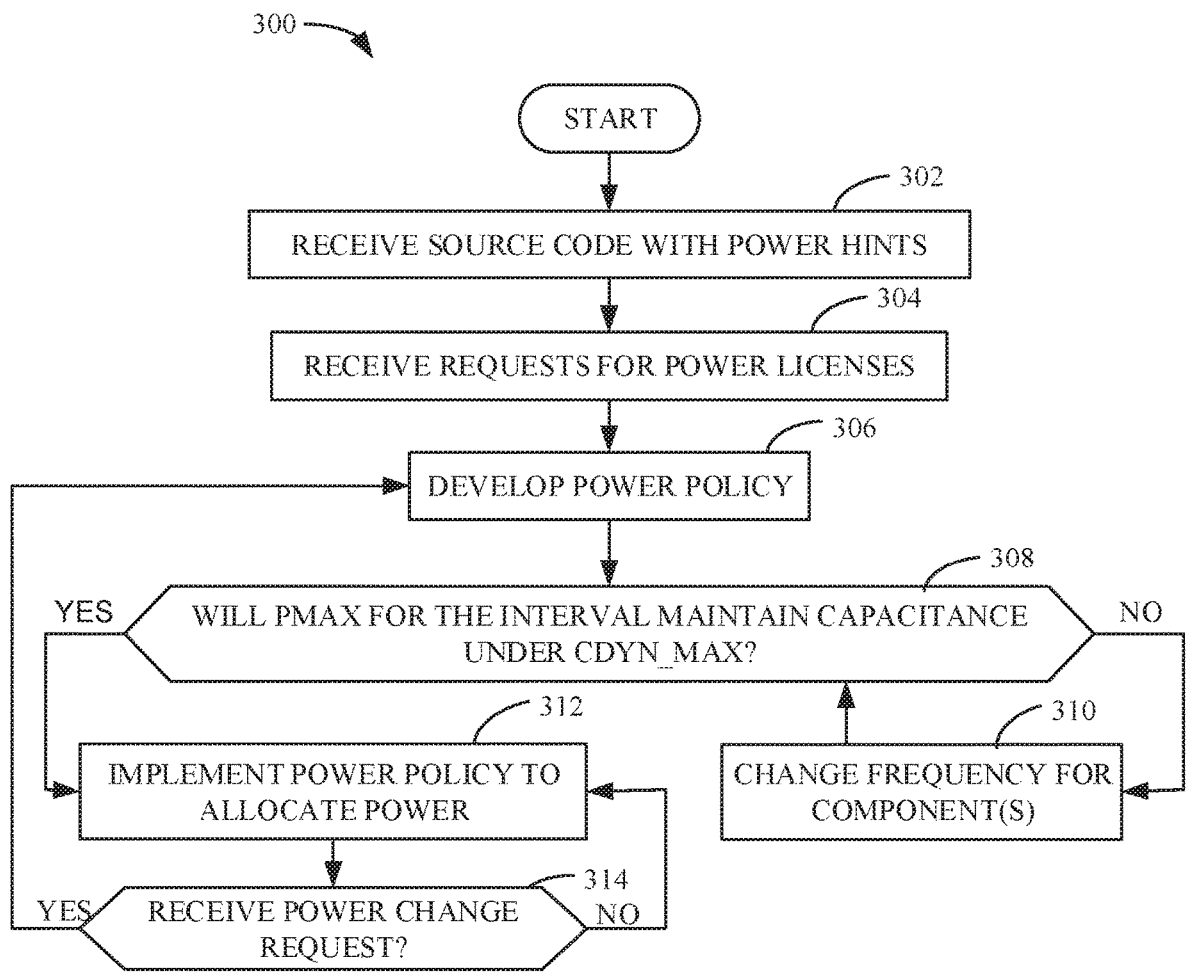
FIG. 3 is a flowchart representative of machine readable instructions that may be executed to implement the example power control unit of FIG. 1.

A flowchart representative of example hardware logic, machine readable instructions, hardware implemented state machines, and/or any combination thereof for implementing the power control unit 106 of FIG. 1 is shown in FIG. 3. The machine readable instructions may be one or more executable programs or portion(s) of an executable program for execution by a computer processor such as the processor 512 shown in the example processor platform 400 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 3, many other methods of implementing the example power control unit 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device, and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 2 and 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 2 includes a program 200 for compiling source code with hints of power behavior of components of an AI network such as, for example, the power consumption units 108, 110, 112, 114 of the accelerator 102 of FIG. 1. The program 200 includes the receiver 122 of the compiler 104 receiving workload information from the power consumption units 108, 110, 112, 114 of the accelerator 102 (block 202). In other examples, the receiver 102 actively retrieves the workload information. In other examples, the receiver 102 otherwise access the workload information. The workload information includes information related to power level consumption, power consumption duration, memory usage, and/or other data related to operating states of the one or more operating characteristics of one or more of the power consumption units 108, 110, 112, 114.

The profiler 124 selects workload parameters to test the power consumption behavior of the power consumption units 108, 110, 112, 114 (block 204). The profiler 124 analyzes the behavior of the power consumption units 108, 110, 112, 114 (block 206). The profiler 124 also builds a power profile based on the behavior of the power consumption units 108, 110, 112, 114 (block 208). The profiler 124 determines if there are additional parameters to investigate and test (block 120). If there are additional parameters to investigate, the profiler 124 selects another parameter to test (block 204). In some examples, the power profile built by the profiler 124 includes tables or graphs showing operating levels of the power consumption units 108, 110, 112, 114 including, for example, Tables 1 and 2. In some examples, the profiler 124 builds the power profile offline.

If the profiler 124 determines that there are no additional parameters to test (block 210), the profiler 124 builds intervals of power requests (block 212). The intervals are duration of operating time for the power consumption units 108, 110, 112, 114. In some examples, the intervals are set to a value such as, for example 500 microseconds. In other examples, other durations may be used for intervals. Also, in some examples, the value of the duration of an interval may change over time. In some examples, the interval time is set in accordance with operating times of the power consumption units 108, 110, 112, 114. For example, typical operations of the power consumption units 108, 110, 112, 114 of a computing device may occur very quickly, which validates an interval of 500 microseconds. If an interval time is set too long, the power control unit 106 may delay in a reallocation of power, resulting in less efficient power allocation. In some examples, a delayed power reallocation could cause operation of the computing device to slow.

The comparator 126 of the compiler 104 determines if the maximum power for an interval will maintain capacitance of the accelerator 102 under a maximum dynamic capacitance, Cdyn_max (block 214). If the comparator 126 of the compiler 104 determines that the maximum power would cause the maximum dynamic capacitance to be exceeded (block 214), the profiler 124 reallocates power for the interval among the power consumption units 108, 110, 112, 114 (block 216). For example, the profiler 124 can reduce power allocated for the first power consumption unit 108 to maintain power and maximum dynamic capacitance within desired thresholds. In another example, the profiler 124 can increase power allocated for the first power consumption unit 108 and decrease power allocated for the second power consumption unit 110 and the third power consumption unit 112 to maintain power and maximum dynamic capacitance within desired thresholds. Other combinations and reallocations of power can be used.

If the comparator 126 of the compiler 104 determines that the maximum power would not cause the maximum capacitance to be exceeded (block 214), the code generator 130 inserts hints of the power behavior and consumption of the power consumption units 108, 110, 112, 114 into source code (block 218). The output 132 of the compiler 104 communicates the source code to the power control unit 106 (block 220).

FIG. 3 includes a program 300 for creating and implementing a power policy using hints of power behavior of components of an AI network such as, for example, the power consumption units 108, 110, 112, 114 of the accelerator 102 of FIG. 1. The program 300 includes the receiver 134 of the power control unit 106 receiving source code with power hints from the compiler 104 (block 302). The program 300 also includes the receiver 134 of the power control unit 106 receiving power license requests from the power consumption units 108, 110, 112, 114 (block 304).

The optimizer 136 analyzes the details of hints and the power license requests and develops a power policy (block 306). For example, the optimizer 136 reviews the hints to determine the power behavior of the power consumption units 108, 110, 112, 114 at the power levels requested by the power consumption units 108, 110, 112, 114 in the power license requests. The optimizer 136 can map out different operating states of the power consumption units 108, 110, 112, 114 for different durations of time intervals based on the known behavior included in the hints.

The comparator 138 of the power control unit 106 determines if the maximum power for an interval or time period during execution of the power consumption units 108, 110, 112, 114 will maintain capacitance of the accelerator 102 under a maximum dynamic capacitance, Cdyn_max (block 308). If the comparator 138 of the power control unit 106 determines that the maximum power would cause the maximum dynamic capacitance to be exceeded (block 308), the optimizer 136 changes an operating frequency of one or more of the power consumption units 108, 110, 112, 114 (block 310). Lowering the operating frequency will lower power and help maintain the desired capacitance and/or power level based on the relationship of power, frequency, and capacitance noted in Equation 1. In other examples, other operating parameters of the power consumption units 108, 110, 112, 114 may be altered to control the power and capacitance. If the comparator 138 of the power control unit 106 determines that the maximum power would not cause the maximum capacitance to be exceeded (block 308), the optimizer 136 implements the power policy to allocate, via the output 142 of the power control unit 106, power among the power consumption units 108, 110, 112, 114 (block 312).

The optimizer 136 determines a change in a power level has been requested by one or more of the power consumption units 108, 110, 112, 114 (block 314). If there is a change in requested power, the optimizer 136 develops an updated power policy based on the hints in the source code and the subsequent power license requests (block 306). The updated power policy may change the power levels allocated to different ones of the power consumption units 108, 110, 112, 114 for different periods of time. If there is no change in requested power (block 314), the optimizer 136 and the output 142 of the power control unit 106 continue with the implementation of the power policy (block 312).

Figure 4:
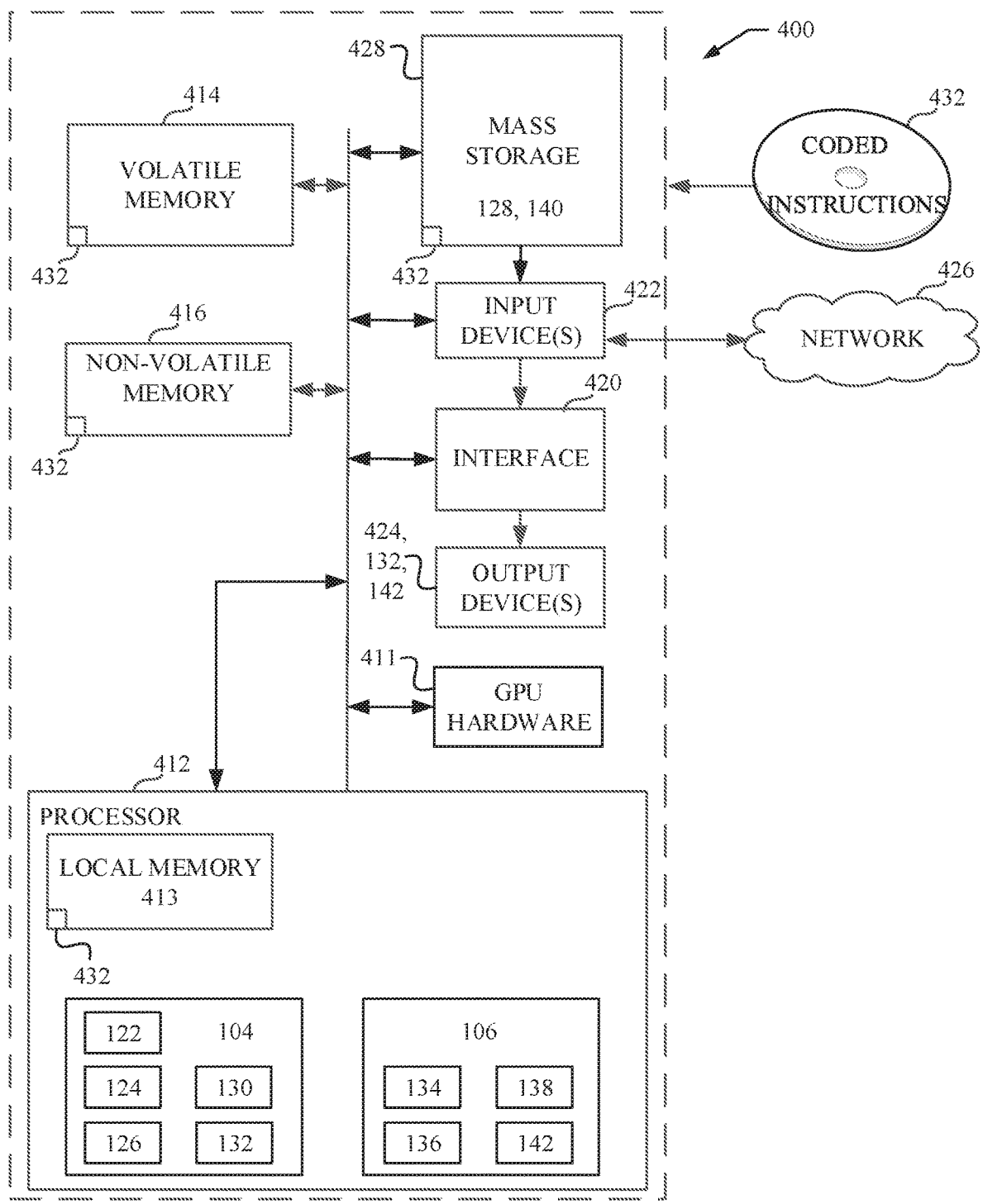
FIG. 4 is a block diagram of an example processing platform structured to execute the instructions of FIGS. 2 and 3 to implement the compiler and the power control unit of FIG. 1.

FIG. 4 is a block diagram of an example processor platform 400 structured to execute the instructions of FIGS. 2 and 3 to implement the compiler 104 and/or power control unit 106 of FIG. 1. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 412 implements the compiler 104, the receiver 122 of the compiler 104, the profiler 124, the comparator 126 of the compiler 104, the code generator 130, and the output 132 of the compiler 104. The processor 412 also implements the power control unit 106, the receiver 134 of the power control unit 106, the optimizer 136, the comparator 138 of the power control unit 106, and the output 142 of the power control unit. In other examples, the compiler 104 and the power control unit 106 have separate processing platforms 400.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 424 are also connected to the interface circuit 420 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 420 of the illustrated example, thus, typically includes a graphics driver card, a graphics driver chip, and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

The machine executable instructions 432 of FIGS. 2 and 3 may be stored in the mass storage device 428, in the volatile memory 414, in the non-volatile memory 416, and/or on a removable non-transitory computer readable storage medium such as a CD or DVD.

From the foregoing, it will be appreciated that example apparatus, devices, systems, methods, and articles of manufacture have been disclosed that allocate power among power consumption units or components of a computing device based on guidance from a compiler. The disclosed apparatus, devices, systems, methods, and articles of manufacture improve the efficiency of using a computing device by managing power distribution to optimize performance of an accelerator, AI module, and computing device overall. Instead of trying to predict future behavior of the power consumption units based on past behavior, the power management scheme disclosed herein detects power requests from the power consumption units on a system on a chip or otherwise in the computing device and allocated the power based on compiler guided power behavior hints.

The apparatus, devices, systems, methods, and articles of manufacture proactively protect the modules of heavy power consumption the computing device overall. With some computing devices, a power management or control unit cannot respond fast enough to some hardware events to avoid the need for high guard-bands or loss of performance due. In the examples disclosed herein, the dynamic power optimization leverages knowledge of the compiler that was developed offline and does not rely only on patterns that are detectable during execution, where undetected power patterns may result in inefficient power management and performance degradation. Also, in the examples disclosed herein benefit from knowing performance behavior ahead of time, which is typical for AI domain.

In a case of unknown or miss in accuracy of power allocations, a guard band is typically taken to allow the worst case scenario in power consumption. Performance of the computing device is diminished in accordance with the size of the guard band. In some devices, throttling is performed when power is misallocated in an effort to maintain functionality. However, throttling also degrades performance. The examples disclosed herein provide the ability to take advantage of the behavior of AI workloads (or other pre-defined workloads) and utilize knowledge gained or developed during compilation and prior to runtime of the computing device to allow power characteristics directions or hints to be transferred to the power management hardware, e.g., the power control unit. The power hints, including power consumption levels and durations, are used for power optimizations and dynamic guard band allocation. In the examples disclosed herein functionality is maintained throughout operation of the computing device and performance is not degraded. This is a unique approach that is beneficial to the domain of AI accelerators, among other uses. Thus, the disclosed apparatus, devices, systems, methods, and articles of manufacture are accordingly directed to one or more improvement(s) in the functioning of a computer.

Apparatus, devices, systems, methods, and articles of manufacture are disclosed to allocate power in a computing device. Example 1 is a system to allocate power in a computing device, the system comprising a compiler to analyze power consumption behavior of power consumption units of the computing device, build a power profile, and generate source code with hints of the power profile. The system of Example 1 also includes a power control circuit to develop a power policy using the hints of the power profile and requests for power licenses from the power consumption units of the computing device, and allocate power to the power consumption units based on the power profile.

Example 2 includes the system of Example 1, wherein the compiler is to analyze power consumption behavior of power consumption units over a plurality of workload parameters of the power consumption units.

Example 3 includes the system of Example 1, wherein the compiler is to build the power profile offline and the power control circuit is to allocate power during a runtime.

Example 4 includes the system of Example 1, wherein the power consumption units are computational units of an artificial intelligence network.

Example 5 includes the system of Example 1, wherein the compiler is to build the power profile by defining intervals of power requests, and verifying a maximum power in respective intervals maintains capacitance less than a maximum Cdyn.

Example 6 includes the system of Example 5, wherein the compiler is to reallocate power in the power profile if the maximum power in an interval would cause the capacitance to exceed the maximum Cdyn.

Example 7 includes the system of Example 1, wherein the compiler is to include information related to a duration of time of power consumption by the power consumption units in the hint.

Example 8 includes the system of Example 1, wherein the power control circuit is to verify if a maximum power in the power policy maintains capacitance less than a maximum Cdyn.

Example 9 includes the system of Example 8, wherein the power control circuit is to change a frequency of operation of one or more of the power consumption units if the maximum power in an interval would cause the capacitance to exceed the maximum Cdyn.

Example 10 includes the system of Example 1, wherein the power policy is a first power policy developed at a first time, and the power control unit is to develop a second power policy at a second time subsequent to the first time based on the hints of the power profile and a change in a power request from one or more of the power consumption units.

Example 11 is a system to allocate power in a computing device, the system comprising a compiler including means for analyzing power consumption behavior of power consumption units of the computing device and building a power profile and means for generating source code with hints of the power profile. The system of Example 11 also includes a power control unit including means for developing a power policy using the hints of the power profile and requests for power licenses from the power consumption units of the computing device and allocating power to the power consumption units based on the power profile.

Example 12 includes the system of Example 11, wherein the analyzing means is to analyze power consumption behavior of power consumption units over a plurality of workload parameters of the power consumption units.

Example 13 includes the system of Example 11, wherein the analyzing means is to build the power profile offline and the power control unit is to allocate power during a runtime.

Example 14 includes the system of Example 11, wherein the power consumption units are computational units of an artificial intelligence network.

Example 15 includes the system of Example 11, wherein the analyzing means is to build the power profile by defining intervals of power requests, and the compiler further includes means for verifying a maximum power in respective intervals maintains capacitance less than a maximum Cdyn.

Example 16 includes the system of Example 15, wherein the analyzing means is to reallocate power in the power profile if the maximum power in an interval would cause the capacitance to exceed the maximum Cdyn.

Example 17 includes the system of Example 11, wherein the code generating means is to include information related to a duration of time of power consumption by the power consumption units in the hint.

Example 18 includes the system of Example 11, wherein the power control unit further includes a means for verifying if a maximum power in the power policy maintains capacitance less than a maximum Cdyn.

Example 19 includes the system of Example 18, wherein the power policy means is to change a frequency of operation of one or more of the power consumption units if the maximum power in an interval would cause the capacitance to exceed the maximum Cdyn.

Example 20 includes the system of Example 11, wherein the power policy is a first power policy developed at a first time, and the power policy means is to develop a second power policy at a second time subsequent to the first time based on the hints of the power profile and a change in a power request from one or more of the power consumption units.

Example 21 is a non-transitory computer readable storage medium comprising computer readable instructions that, when executed, cause one or more processors to, at least: analyze power consumption behavior of power consumption units of the computing device; build a power profile; generate source code with hints of the power profile; develop a power policy using the hints of the power profile and requests for power licenses from the power consumption units of the computing device; and allocate power to the power consumption units based on the power profile.

Example 22 includes the storage medium of Example 21, wherein the instructions cause the one or more processors to analyze power consumption behavior of power consumption units over a plurality of workload parameters of the power consumption units.

Example 23 includes the storage medium of Example 21, wherein the instructions cause the one or more processors to build the power profile offline and implement the power policy to allocate power during a runtime.

Example 24 includes the storage medium of Example 21, wherein the power consumption units are computational units of an artificial intelligence network.

Example 25 includes the storage medium of Example 21, wherein the instructions cause the one or more processors to build the power profile by: defining intervals of power requests; and verifying a maximum power in respective intervals maintains capacitance less than a maximum Cdyn.

Example 26 includes the storage medium of Example 25, wherein the instructions cause the one or more processors to reallocate power in the power profile if the maximum power in an interval would cause the capacitance to exceed the maximum Cdyn.

Example 27 includes the storage medium of Example 21, wherein the instructions cause the one or more processors to include information related to a duration of time of power consumption by the power consumption units in the hint.

Example 28 includes the storage medium of Example 21, wherein the instructions cause the one or more processors verify if a maximum power in the power policy maintains capacitance less than a maximum Cdyn.

Example 29 includes the storage medium of Example 28, wherein the instructions cause the one or more processors to change a frequency of operation of one or more of the power consumption units if the maximum power in an interval would cause the capacitance to exceed the maximum Cdyn.

Example 30 includes the storage medium of Example 21, wherein the power policy is a first power policy developed at a first time, and the instructions cause the one or more processors to develop a second power policy at a second time subsequent to the first time based on the hints of the power profile and a change in a power request from one or more of the power consumption units.

Example 31 is an apparatus comprising: memory including machine readable instructions; and processor circuitry to execute the instructions to: analyze power consumption behavior of power consumption units of the computing device; build a power profile; generate source code with hints of the power profile; develop a power policy using the hints of the power profile and requests for power licenses from the power consumption units of the computing device; and allocate power to the power consumption units based on the power profile.

Example 32 includes the apparatus of Example 31, wherein the processor circuitry to is execute the instruction to analyze power consumption behavior of power consumption units over a plurality of workload parameters of the power consumption units.

Example 33 includes the apparatus of Example 31, wherein the processor circuitry to is execute the instruction to build the power profile offline and implement the power policy to allocate power during a runtime.

Example 34 includes the apparatus of Example 31, wherein the power consumption units are computational units of an artificial intelligence network.

Example 35 includes the apparatus of Example 31, wherein the processor circuitry to is execute the instruction to build the power profile by defining intervals of power requests; and verifying a maximum power in respective intervals maintains capacitance less than a maximum Cdyn.

Example 36 includes the apparatus of Example 35, wherein the processor circuitry to is execute the instruction to reallocate power in the power profile if the maximum power in an interval would cause the capacitance to exceed the maximum Cdyn.

Example 37 includes the apparatus of Example 31, wherein the processor circuitry to is execute the instruction to include information related to a duration of time of power consumption by the power consumption units in the hint.

Example 38 includes the apparatus of Example 31, wherein the processor circuitry to is execute the instruction to verify if a maximum power in the power policy maintains capacitance less than a maximum Cdyn.

Example 39 includes the apparatus of Example 38, wherein the processor circuitry to is execute the instruction to change a frequency of operation of one or more of the power consumption units if the maximum power in an interval would cause the capacitance to exceed the maximum Cdyn.

Example 40 includes the apparatus of Example 31, wherein the power policy is a first power policy developed at a first time, and the processor circuitry to is execute the instruction to develop a second power policy at a second time subsequent to the first time based on the hints of the power profile and a change in a power request from one or more of the power consumption units.

Example 41 is a method to allocate power in a computing device, the method comprising: analyzing power consumption behavior of power consumption units of the computing device; building a power profile; generating source code with hints of the power profile; developing a power policy using the hints of the power profile and requests for power licenses from the power consumption units of the computing device; and allocating power to the power consumption units based on the power profile.

Example 42 includes the method of Example 41, further including analyzing power consumption behavior of power consumption units over a plurality of workload parameters of the power consumption units.

Example 43 includes the method of Example 41, wherein the building of the power profile is to occur offline and the allocating of power is to occur during a runtime.

Example 44 includes the method of Example 41, wherein the power consumption units are computational units of an artificial intelligence network.

Example 45 includes the method of Example 41, wherein the building of the power profile includes: defining intervals of power requests; and verifying a maximum power in respective intervals maintains capacitance less than a maximum Cdyn.

Example 46 includes the method of Example 45, further including reallocating power in the power profile if the maximum power in an interval would cause the capacitance to exceed the maximum Cdyn.

Example 47 includes the method of Example 41, further including incorporating related to a duration of time of power consumption by the power consumption units in the hint.

Example 48 includes the method of Example 41, further including verifying if a maximum power in the power policy maintains capacitance less than a maximum Cdyn.

Example 49 includes the method of Example 48, further including changing a frequency of operation of one or more of the power consumption units if the maximum power in an interval would cause the capacitance to exceed the maximum Cdyn.

Example 50 includes the method of Example 41, wherein the power policy is a first power policy developed at a first time, and the method further includes developing a second power policy at a second time subsequent to the first time based on the hints of the power profile and a change in a power request from one or more of the power consumption units.

Although certain example methods, apparatus and articles of manufacture have been disclosed herein, the scope of coverage of this patent is not limited thereto. On the contrary, this patent covers all apparatus, devices, systems, methods, and articles of manufacture fairly falling within the scope of the claims of this patent.

In addition, descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following claims are hereby incorporated into this Detailed Description by this reference, with each claim standing on its own as a separate embodiment of the present disclosure.

What is claimed is:

1. A system to allocate power in a computing device, the system comprising:
    a compiler to:
        analyze power consumption behavior of power consumption units of the computing device;
        build a power profile;
        generate source code with hints of the power profile; and
        include information related to a duration of time of power consumption by the power consumption units in the hints; and
    a power control circuit to:
        develop a power policy using the hints of the power profile in the source code and requests for power from the power consumption units of the computing device; and
        allocate power to the power consumption units based on the power profile.

2. The system of claim 1, wherein the compiler is to analyze power consumption behavior of power consumption units over a plurality of workload parameters of the power consumption units.

3. The system of claim 1, wherein the compiler is to build the power profile offline and the power control circuit is to allocate power during a runtime.

4. The system of claim 1, wherein the power consumption units are computational units of an artificial intelligence network.

5. The system of claim 1, wherein the compiler is to build the power profile by:
   defining intervals of power requests; and
   verifying a maximum power in respective intervals maintains capacitance less than a maximum Cdyn.

6. The system of claim 5, wherein the compiler is to reallocate power in the power profile if the maximum power in an interval would cause the capacitance to exceed the maximum Cdyn.

7. The system of claim 1, wherein the power control circuit is to verify if a maximum power in the power policy maintains capacitance less than a maximum Cdyn.

8. The system of claim 7, wherein the power control circuit is to change a frequency of operation of one or more of the power consumption units if the maximum power in an interval would cause the capacitance to exceed the maximum Cdyn.

9. The system of claim 1, wherein the power policy is a first power policy developed at a first time, and the power control circuit is to develop a second power policy at a second time subsequent to the first time based on the hints of the power profile and a change in a power request from one or more of the power consumption units.

10. A system to allocate power in a computing device, the system comprising:
    a compiler including:
       means for analyzing power consumption behavior of power consumption units of the computing device and building a power profile; and
       means for generating source code with hints of the power profile, the source code generating means to include information related to a duration of time of power consumption by the power consumption units in the hints; and
    a power control unit including means for developing a power policy using the hints of the power profile in the source code and requests for power from the power consumption units of the computing device and allocating power to the power consumption units based on the power profile.

11. The system of claim 10, wherein the analyzing means is to analyze power consumption behavior of power consumption units over a plurality of workload parameters of the power consumption units.

12. The system of claim 10, wherein the analyzing means is to build the power profile offline and the power control unit is to allocate power during a runtime.

13. The system of claim 10, wherein the power consumption units are computational units of an artificial intelligence network.

14. The system of claim 10, wherein the analyzing means is to build the power profile by defining intervals of power requests, and the compiler further includes means for verifying a maximum power in respective intervals maintains capacitance less than a maximum Cdyn.

15. The system of claim 14, wherein the analyzing means is to reallocate power in the power profile if the maximum power in an interval would cause the capacitance to exceed the maximum Cdyn.

16. The system of claim 10, wherein the power control unit further includes a means for verifying if a maximum power in the power policy maintains capacitance less than a maximum Cdyn.

17. The system of claim 16, wherein the power policy means is to change a frequency of operation of one or more of the power consumption units if the maximum power in an interval would cause the capacitance to exceed the maximum Cdyn.

18. The system of claim 10, wherein the power policy is a first power policy developed at a first time, and the power policy means is to develop a second power policy at a second time subsequent to the first time based on the hints of the power profile and a change in a power request from one or more of the power consumption units.

* * * * *